US012647803B2

(12) United States Patent
Morita et al.

(10) Patent No.: US 12,647,803 B2
(45) Date of Patent: Jun. 2, 2026

(54) MOBILE TERMINAL TEST APPARATUS AND CONTROL MESSAGE TRANSMISSION METHOD THEREOF

(71) Applicant: ANRITSU CORPORATION, Kanagawa (JP)

(72) Inventors: Atsuki Morita, Kanagawa (JP); Daiki Kano, Kanagawa (JP); Takumi Nakamura, Kanagawa (JP); Masahiro Arayama, Kanagawa (JP); Nobuaki Shimakawa, Kanagawa (JP); Daisuke Nakagawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 694 days.

(21) Appl. No.: 18/052,742

(22) Filed: Nov. 4, 2022

(65) Prior Publication Data

US 2023/0362690 A1 Nov. 9, 2023

(30) Foreign Application Priority Data

Dec. 2, 2021 (JP) ................................. 2021-196187

(51) Int. Cl.
H04W 24/06 (2009.01)

(52) U.S. Cl.
CPC ................................... H04W 24/06 (2013.01)

(58) Field of Classification Search
CPC .............................. H04W 24/06; Y02D 30/70
See application file for complete search history.

(56) References Cited

U.S. PATENT DOCUMENTS

| | | | | |
|---|---|---|---|---|
| 8,995,992 B1 * | 3/2015 | Cohen | ................... | H04W 24/06 |
| | | | | 455/410 |
| 9,625,511 B2 * | 4/2017 | Chen | ...................... | G01R 31/50 |
| 9,787,534 B1 * | 10/2017 | Kadosh | ................... | H04L 43/50 |
| 9,852,365 B2 * | 12/2017 | Asahara | ............. | H04N 1/00411 |
| 9,930,699 B2 * | 3/2018 | Stattin | ................... | H04W 48/02 |
| 10,142,873 B2 * | 11/2018 | Van Lieshout | ... | H04W 36/0005 |
| 10,218,815 B2 * | 2/2019 | Bao | ......................... | H04L 67/30 |
| 10,945,105 B1 * | 3/2021 | Konen | ................. | H04W 4/029 |
| 12,160,287 B2 * | 12/2024 | Chang | ................... | H04W 24/02 |

(Continued)

FOREIGN PATENT DOCUMENTS

| | | | | | |
|---|---|---|---|---|---|
| CA | 2859587 A1 * | 8/2013 | ........... | G01S 5/0027 |
| CN | 111259033 A * | 6/2020 | ......... | G06F 16/2365 |

(Continued)

*Primary Examiner* — Sujoy K Kundu
*Assistant Examiner* — Vladislav Y Agureyev
(74) *Attorney, Agent, or Firm* — McDonald Hopkins LLC

(57) ABSTRACT

There is provided a mobile terminal test apparatus capable of efficiently performing a test by collectively processing control messages. There is included a control unit 6 that switches, as a mode for transmitting a control message to a mobile terminal 10, between an Automatic mode in which by a setting of a parameter by a user, the control message is transmitted to the mobile terminal 10 when it becomes necessary to transmit the control message to the mobile terminal 10, and a Manual mode in which change information on the parameter by the setting of the parameter by the user is held, and the control message corresponding to the held change information is transmitted to the mobile terminal 10 when a parameter application instruction is given by the user.

4 Claims, 4 Drawing Sheets

(56) References Cited

U.S. PATENT DOCUMENTS

| | | | | |
|---|---|---|---|---|
| 2002/0049558 A1* | 4/2002 | Reis | G01R 31/31905 | 702/122 |
| 2006/0064266 A1* | 3/2006 | Mok | H04W 24/06 | 702/117 |
| 2006/0128373 A1* | 6/2006 | Cochrane | H04M 1/24 | 455/67.11 |
| 2007/0043805 A1* | 2/2007 | Izaki | G06F 3/1234 | 709/201 |
| 2007/0053367 A1* | 3/2007 | Tyebji | H04W 88/16 | 370/401 |
| 2008/0002584 A1* | 1/2008 | Leng | H04W 28/02 | 370/235 |
| 2012/0322439 A1* | 12/2012 | Ding | H04W 24/00 | 455/425 |
| 2012/0327796 A1* | 12/2012 | Ozaki | H04W 24/06 | 370/252 |
| 2013/0005384 A1* | 1/2013 | Tanaka | H04M 1/24 | 455/517 |
| 2013/0297099 A1* | 11/2013 | Rovik | B60R 25/01 | 701/2 |
| 2014/0003242 A1* | 1/2014 | Nadas | H04L 47/17 | 370/235 |
| 2014/0006816 A1* | 1/2014 | Oikawa | G06F 1/3268 | 713/310 |
| 2014/0018033 A1* | 1/2014 | Luna | H04W 72/535 | 455/405 |
| 2014/0105066 A1* | 4/2014 | Erdmann | H04L 41/0853 | 370/254 |
| 2014/0134998 A1* | 5/2014 | Wang | H04B 17/29 | 455/425 |
| 2014/0242976 A1* | 8/2014 | Suenaga | H04W 16/22 | 455/423 |
| 2014/0278647 A1* | 9/2014 | Rameshkumar | G06Q 10/105 | 705/320 |
| 2014/0293818 A1* | 10/2014 | Sesia | H04L 1/0026 | 370/252 |
| 2014/0321298 A1* | 10/2014 | Chow | H04L 41/26 | 370/252 |
| 2014/0365609 A1* | 12/2014 | Luna | G06F 9/5027 | 709/217 |
| 2015/0043410 A1* | 2/2015 | Chaturvedi | H04W 52/0229 | 370/311 |
| 2015/0264590 A1* | 9/2015 | Michl | H04W 24/06 | 455/67.14 |
| 2015/0289082 A1* | 10/2015 | Salokannel | G01S 1/0428 | 455/41.2 |
| 2015/0382212 A1* | 12/2015 | Elliott | H04L 61/5007 | 370/252 |
| 2016/0165495 A1 | 6/2016 | Awano et al. | | |
| 2016/0190797 A1* | 6/2016 | Yamane | H04L 25/0284 | 363/56.01 |
| 2016/0255495 A1* | 9/2016 | Huang | H04W 8/245 | 455/550.1 |
| 2017/0347376 A1* | 11/2017 | Sakai | H04W 74/0808 | |
| 2017/0366282 A1* | 12/2017 | Aoki | H04W 24/06 | |
| 2018/0034560 A1* | 2/2018 | Foegelle | H04B 17/0087 | |
| 2018/0043903 A1* | 2/2018 | Hosey | B60W 50/08 | |
| 2018/0088797 A1* | 3/2018 | Mcatee | G08B 5/36 | |
| 2019/0007862 A1* | 1/2019 | Ha | H04W 88/16 | |
| 2019/0037424 A1* | 1/2019 | Shirasaki | H04L 5/001 | |
| 2019/0041496 A1* | 2/2019 | Salvesen | G01S 7/4052 | |
| 2019/0103999 A1* | 4/2019 | Pickerd | H04L 25/03031 | |
| 2019/0124529 A1* | 4/2019 | García | H04W 24/06 | |
| 2019/0159166 A1* | 5/2019 | Aggarwal | H04L 67/535 | |
| 2019/0174721 A1* | 6/2019 | Stapelfeld | A01K 29/005 | |
| 2019/0379887 A1* | 12/2019 | Marino | H04L 12/2805 | |
| 2020/0169335 A1* | 5/2020 | Hosoya | H04B 17/20 | |
| 2020/0213470 A1* | 7/2020 | Kikuchi | G06F 3/1204 | |
| 2020/0229206 A1* | 7/2020 | Badic | G05D 1/225 | |
| 2020/0329120 A1* | 10/2020 | Preveraud | G06F 8/65 | |
| 2020/0344658 A1* | 10/2020 | Huang | H04W 24/02 | |
| 2021/0072206 A1* | 3/2021 | Nigg | G01N 33/0006 | |
| 2021/0098124 A1* | 4/2021 | Crook | H02J 7/0048 | |
| 2021/0120146 A1* | 4/2021 | del Rosario | H04N 1/00395 | |
| 2021/0204886 A1* | 7/2021 | Frieder | H04W 4/21 | |
| 2021/0243621 A1* | 8/2021 | Kano | H04W 24/06 | |
| 2021/0255749 A1* | 8/2021 | Mueller | H04W 4/80 | |
| 2021/0255984 A1* | 8/2021 | Khatri | G06F 13/4282 | |
| 2021/0297318 A1* | 9/2021 | Chatterjee | H04W 24/06 | |
| 2021/0306022 A1* | 9/2021 | Fernando | H01Q 21/28 | |
| 2021/0392520 A1* | 12/2021 | Li | H04W 24/04 | |
| 2021/0406131 A1* | 12/2021 | Brenner | H04L 41/084 | |
| 2022/0058901 A1* | 2/2022 | Li | G08B 7/06 | |
| 2022/0095122 A1* | 3/2022 | Emani | H04L 41/22 | |
| 2022/0158926 A1* | 5/2022 | Wennerström | H04L 43/20 | |
| 2022/0225114 A1* | 7/2022 | Feng | H04W 16/10 | |
| 2022/0334938 A1* | 10/2022 | Trgovich | G06F 11/2268 | |
| 2022/0365530 A1* | 11/2022 | Foster | G05D 1/0022 | |
| 2022/0369132 A1* | 11/2022 | Song | H04B 17/19 | |
| 2022/0393753 A1* | 12/2022 | Nakayama | H04B 7/0617 | |
| 2023/0087249 A1* | 3/2023 | Zhang | H04L 41/0866 | 709/224 |
| 2023/0094272 A1* | 3/2023 | Zhang | H04L 51/222 | 709/206 |
| 2023/0297324 A1* | 9/2023 | Yu | H04N 21/4852 | 700/94 |
| 2024/0048565 A1* | 2/2024 | Milden | H04L 63/123 | |
| 2024/0298265 A1* | 9/2024 | Lu | H04W 52/0251 | |
| 2025/0227041 A1* | 7/2025 | Eklöf | H04W 36/08 | |

FOREIGN PATENT DOCUMENTS

| | | | | |
|---|---|---|---|---|
| CN | 110188491 B | * | 12/2020 | G06F 30/20 |
| CN | 113419585 A | * | 9/2021 | G05D 27/02 |
| CN | 113438602 A | * | 9/2021 | H04W 4/029 |
| CN | 115811720 A | * | 3/2023 | |
| DE | 102010046863 A1 | * | 3/2012 | H04L 43/50 |
| JP | 6034849 B2 | | 11/2016 | |
| KR | 20170052615 A | * | 5/2017 | H04N 9/3185 |

* cited by examiner

MOBILE TERMINAL TEST APPARATUS AND CONTROL MESSAGE TRANSMISSION METHOD THEREOF

TECHNICAL FIELD

The present invention relates to a mobile terminal test apparatus for testing a mobile terminal.

BACKGROUND ART

In a case where a mobile terminal such as a mobile phone or a data communication terminal that performs communication while moving is developed, it is necessary to test whether or not the developed mobile terminal can normally perform communication. Therefore, a mobile terminal as a device under test (DUT) is connected to a test apparatus that operates as a simulation base station that simulates a function of an actual base station, a test is performed such that communication is performed between the test apparatus and the mobile terminal and contents of this communication is checked.

In the mobile terminal test apparatus, when it becomes necessary to transmit a control message to the mobile terminal by a setting of a user, the control message is transmitted to the mobile terminal.

Patent Document 1 describes that a handover message is transmitted to a mobile terminal when a handover execution operation is performed by an operation of a user.

RELATED ART DOCUMENT

Patent Document

[Patent Document 1] Japanese Patent No. 6034849

DISCLOSURE OF THE INVENTION

Problem that the Invention is to Solve

The transmission of such a control message may be necessary even in a case where a setting as a simulation base station is changed. Meanwhile, when a large number of settings are changed at a start of a test or the like, it takes time to perform the test if an internal process or a message transmission process is performed every time the settings are changed.

Accordingly, an object of the present invention is to provide a mobile terminal test apparatus capable of efficiently performing a test by collectively processing control messages.

Means for Solving the Problem

According to the present invention, there is provided a mobile terminal test apparatus that tests a mobile terminal by simulating a base station of mobile communication, the mobile terminal test apparatus including: a control unit that switches, as a mode for transmitting a control message to the mobile terminal, between an Automatic mode in which by a setting of a parameter by a user, the control message is transmitted to the mobile terminal when it becomes necessary to transmit the control message to the mobile terminal, and a Manual mode in which change information on the parameter by the setting of the parameter by the user is held, and the control message corresponding to the held change information is transmitted to the mobile terminal when a parameter application instruction is given by the user.

With this configuration, the Automatic mode in which the control message is transmitted to the mobile terminal when it becomes necessary to transmit the control message to the mobile terminal and the Manual mode in which the control message corresponding to the held change information is transmitted to the mobile terminal when the parameter application instruction is given by the user can be switched. Therefore, in a case where there are few parameter changes or a case where it is desired to immediately transmit the control message to the mobile terminal, the Automatic mode is selected, and in a case where there are a large number of parameter changes, the Manual mode is selected. Therefore, a processing load or a processing time can be reduced, and the test can be efficiently performed.

In addition, according to the present invention, the mobile terminal test apparatus further includes: a scenario processing unit; and a common memory shared by the control unit and the scenario processing unit, in which the control unit performs updating of the parameter in accordance with contents of the setting of the parameter, writes information on the updated parameter in the common memory, sends a parameter update notification to the scenario processing unit in a case where the Automatic mode is selected, and sends the parameter update notification to the scenario processing unit when the parameter application instruction is given, in a case where the Manual mode is selected, and the scenario processing unit transmits the control message to the mobile terminal when receiving the parameter update notification transmitted from the control unit.

In addition, in the mobile terminal test apparatus according to the present invention, a test in accordance with a standard of 3rd generation partnership project is performed on the mobile terminal, the Manual mode is applied in a common setting and a Test ID 1 condition among a plurality of test items, and the Automatic mode is applied to a Test ID 2 condition.

In addition, according to the present invention, there is provided a control message transmission method of a mobile terminal test apparatus that tests a mobile terminal by simulating a base station of mobile communication, the method including: a step of holding change information on a parameter by a setting of the parameter by a user; and a step of transmitting a control message corresponding to the held change information to the mobile terminal when a parameter application instruction is given by the user.

With this configuration, the change information on the parameter by the setting of the parameter by the user is held, and the control message corresponding to the held change information is transmitted to the mobile terminal when the parameter application instruction is given by the user. Therefore, even in a case where there are a large number of parameter changes, the processing load or the processing time can be reduced, and the test can be efficiently performed.

Advantage of the Invention

The present invention can provide a mobile terminal test apparatus capable of efficiently performing a test by collectively processing control messages.

BEST MODE FOR CARRYING OUT THE INVENTION

Hereinafter, a mobile terminal test apparatus according to an embodiment of the present invention will be described in detail with reference to the drawings.

Figure 1:
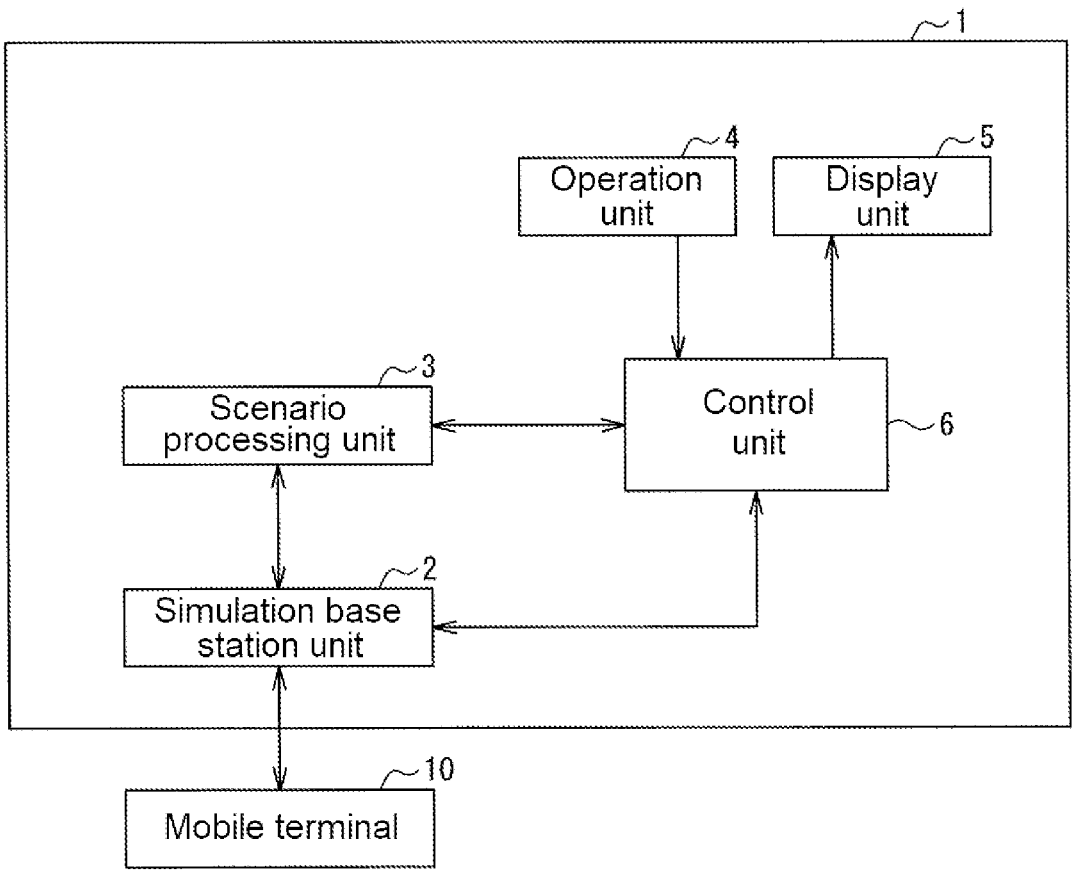
FIG. 1 is a block diagram of main parts of a mobile terminal test apparatus according to an embodiment of the present invention.

In FIG. 1, a mobile terminal test apparatus 1 according to an embodiment of the present invention is provided to transmit and receive RF (radio frequency) signals to and from a mobile terminal 10 in a wired manner via a coaxial cable or the like as a simulation base station. The mobile terminal test apparatus 1 may wirelessly transmit and receive the RF signals to and from the mobile terminal 10 via an antenna.

The mobile terminal test apparatus 1 includes a simulation base station unit 2, a scenario processing unit 3, an operation unit 4, a display unit 5, and a control unit 6.

The simulation base station unit 2 transmits and receives RF signals to and from the mobile terminal 10 under control of the scenario processing unit 3. The simulation base station unit 2 outputs a state or the like of communication with the mobile terminal 10 to the control unit 6.

The simulation base station unit 2 can perform LTE communication with the mobile terminal 10 according to the long term evolution (LTE) standard. The simulation base station unit 2 can perform 5G NR communication with the mobile terminal 10 according to the 5th generation new radio (5G NR) standard.

In accordance with an instruction from the control unit 6, the scenario processing unit 3 reads out a stored scenario, and causes the simulation base station unit 2 to transmit notification information based on the scenario or execute a communication sequence with the mobile terminal 10.

The operation unit 4 is configured with an input device such as a keyboard, a mouse, and a touch panel, and outputs information or the like necessary for generating a scenario input by an operation, to the control unit 6. The display unit 5 is configured with an image display device such as a liquid crystal display, and displays an image for inputting information necessary for generating a scenario, an image illustrating a state during a test, and the like.

In accordance with an instruction input to the operation unit 4, the control unit 6 causes the display unit 5 to display a creation screen for a test scenario to input information necessary for generating the test scenario, or generate the test scenario based on the information input to the operation unit 4 on the creation screen for the test scenario. In accordance with an instruction input to the operation unit 4, the control unit 6 transmits the instruction to the scenario processing unit 3 to execute a test based on a test scenario stored in a storage device or to cause the display unit 5 to display a state or the like during the test based on information such as a state of each layer or a state of communication with the mobile terminal 10 transmitted from the scenario processing unit 3.

Here, the mobile terminal test apparatus 1 is configured with a computer apparatus (not illustrated) provided with a communication module for communicating with the mobile terminal 10. This computer apparatus has each of a central processing unit (CPU), a read only memory (ROM), a random access memory (RAM), a storage device such as a hard disk device, an input and output port, and a touch panel (not illustrated).

A program for causing the computer apparatus to function as the mobile terminal test apparatus 1 is stored in the ROM and the hard disk device of the computer apparatus. That is, the computer apparatus functions as the mobile terminal test apparatus 1 by the CPU executing the program stored in the ROM by using the RAM as a work region.

In this manner, in the present embodiment, the scenario processing unit 3 and the control unit 6 are configured with the CPU, and the simulation base station unit 2 is configured with the communication module.

In the mobile terminal test apparatus 1 having such a configuration, it is necessary to transmit a control message to the mobile terminal 10 when call control such as a handover is performed, or when a setting as a simulation base station is changed.

In the mobile terminal test apparatus 1 of the present embodiment, an Automatic mode and a Manual mode can be selected as modes for transmitting the control message to the mobile terminal 10.

In a case where the Automatic mode is selected, the control unit 6 transmits a control message to the mobile terminal 10 when it is necessary to transmit the control message to the mobile terminal 10, according to a setting of a parameter by a user.

In a case where the Manual mode is selected, the control unit 6 holds change information on a parameter by a setting of the parameter by the user, and transmits a control message corresponding to the held change information when a parameter application instruction is given by the user.

Figure 2:
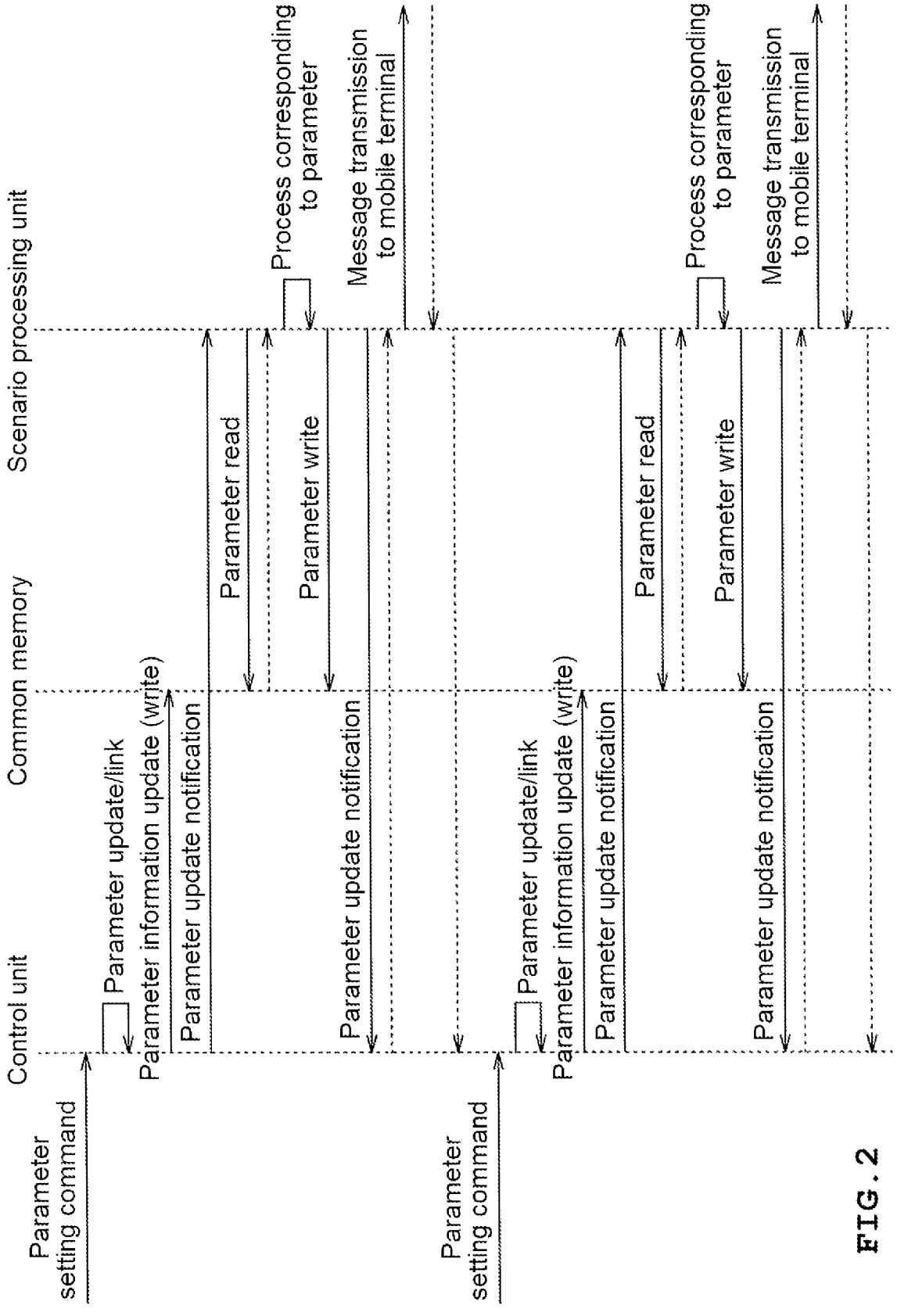
FIG. 2 is a sequence diagram illustrating an example of a process in an Automatic mode of the mobile terminal test apparatus according to one embodiment of the present invention.

In a case where the Automatic mode is selected, as illustrated in FIG. 2, when a parameter setting command is input by an operation of the operation unit 4 by the user, the control unit 6 updates a parameter and updates a linked parameter in accordance with contents of the parameter setting command, writes the updated parameter information in a common memory with the scenario processing unit 3, and sends a parameter update notification indicating that the parameter is updated to the scenario processing unit 3.

When the scenario processing unit 3 receives the parameter update notification from the control unit 6, the scenario processing unit 3 reads the updated parameter from the common memory, performs a process corresponding to the updated parameter, writes the updated parameter with this process in the common memory, sends a parameter update notification indicating that the parameter is updated to the control unit 6, and transmits a necessary control message by the parameter update to the mobile terminal 10.

In a case where the Automatic mode is selected, the control unit 6 performs such a process every time the parameter setting command is input from the user.

Figure 3:
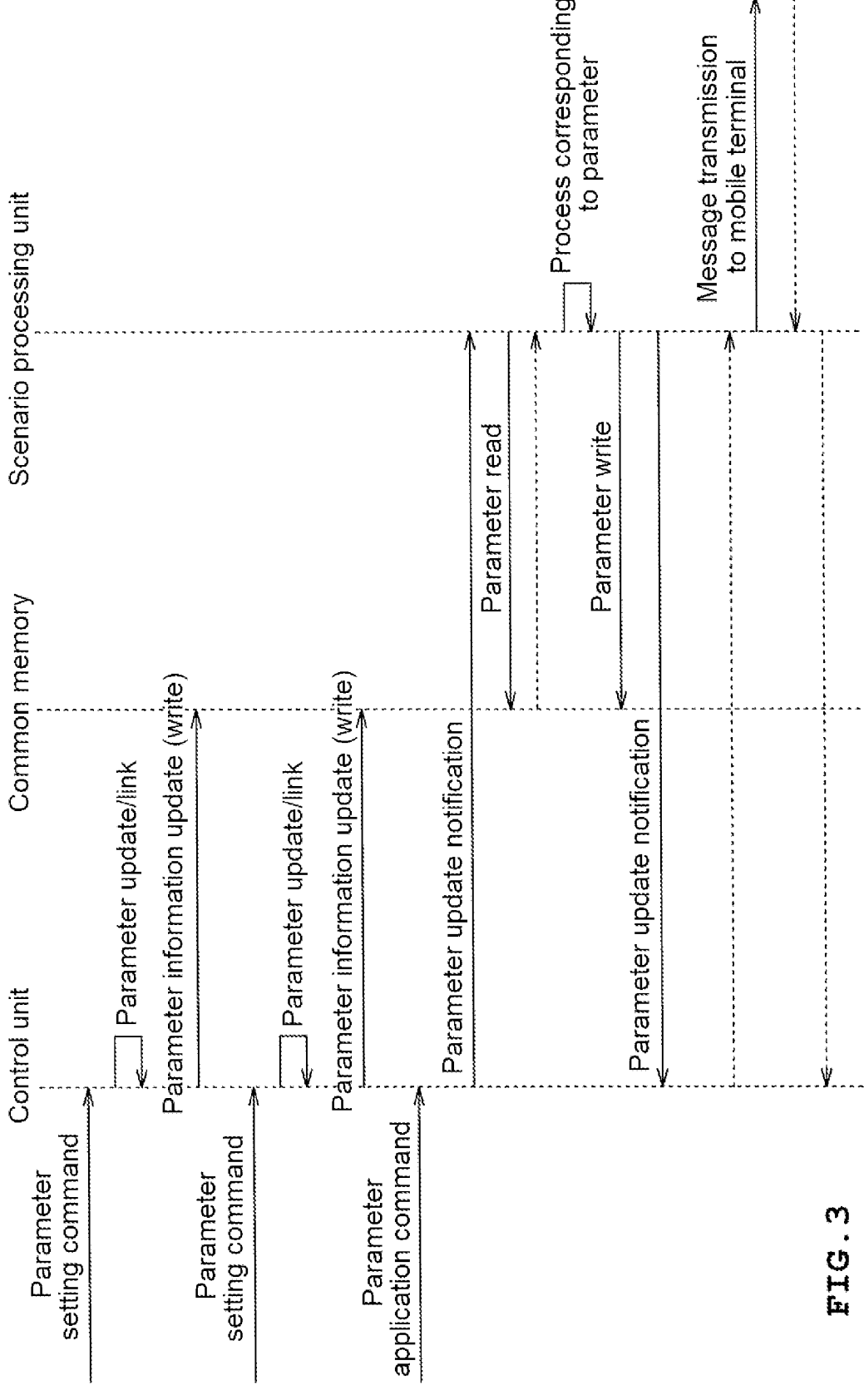
FIG. 3 is a sequence diagram illustrating an example of a process in a Manual mode of the mobile terminal test apparatus according to one embodiment of the present invention.

In a case where the Manual mode is selected, as illustrated in FIG. 3, when a parameter setting command is input by an operation of the operation unit 4 by the user, the control unit 6 updates a parameter and updates a linked parameter in accordance with contents of the parameter setting command, and writes the updated parameter information in the common memory.

Even if a parameter setting command is input by the operation of the operation unit 4 by the user next time, the control unit 6 updates the parameters in conjunction with the update of the parameters in accordance with contents of the parameter setting command, and writes the updated parameter information in the common memory.

When a parameter application command is input by the user operating the operation unit 4, the control unit 6 sends a parameter update notification to the scenario processing unit 3.

When the scenario processing unit 3 receives the parameter update notification from the control unit 6, the scenario processing unit 3 reads the updated parameter from the common memory, performs a process corresponding to the updated parameter, writes the updated parameter with this process in the common memory, sends a parameter update notification indicating that the parameter is updated to the control unit 6, and transmits a necessary control message by the parameter update to the mobile terminal 10.

In this manner, in a case where the Automatic mode is selected, a control message is sent to the mobile terminal 10 every time a parameter change is performed, so this mode is suitable for a case of immediately sending a control message to the mobile terminal 10, such as a handover test. In addition, even in a case where the number of parameter changes is small, a processing load is low and a time is short.

Further, when the Manual mode is selected, no control message is sent to the mobile terminal 10 even if a parameter change is performed, and when an instruction to apply the parameter is sent, a control message corresponding to the previous parameter change is sent to the mobile terminal 10. The processing load and the processing time can be reduced in a case where there are a large number of parameter changes.

State transition of control message transmission of the mobile terminal test apparatus according to the present embodiment configured as described above will be described with reference to FIG. 4.

Figure 4:
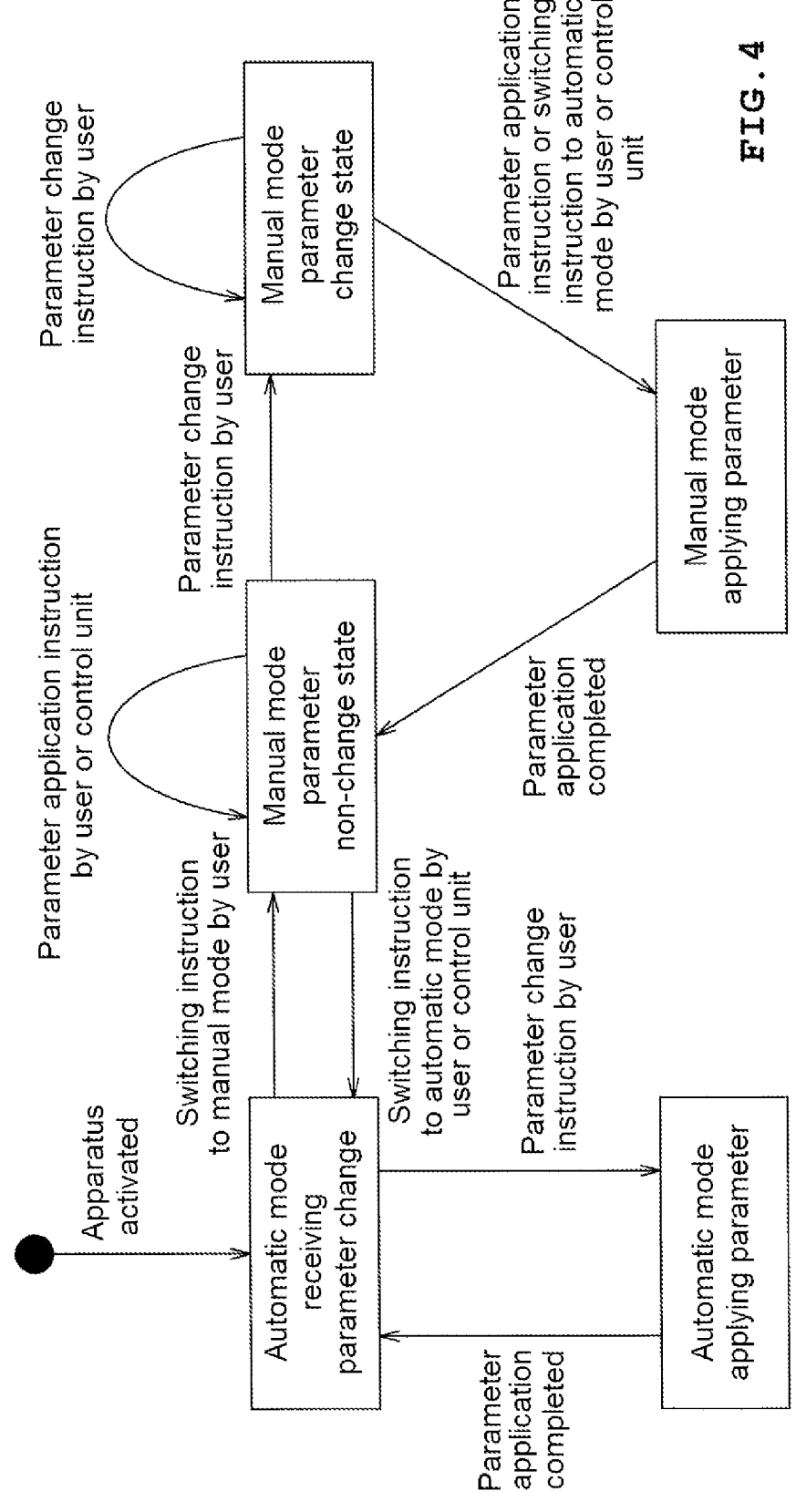
FIG. 4 is a state transition diagram illustrating an example of state transition of control message transmission of the mobile terminal test apparatus according to one embodiment of the present invention.

In FIG. 4, when the mobile terminal test apparatus 1 is activated, the state is shifted to an Automatic mode parameter change reception state.

In the Automatic mode parameter change reception state, when a parameter change instruction is given by the user, the state is shifted to an Automatic mode parameter application state and a parameter application process is performed.

In the Automatic mode parameter application state, when the parameter application is completed, the state is shifted to the Automatic mode parameter change reception state.

In the Automatic mode parameter change reception state, when the user gives a switching instruction to the Manual mode, the state is shifted to a Manual mode parameter non-change state.

In the Manual mode parameter non-change state, when a parameter application instruction is given by the user or the control unit 6, the mobile terminal test apparatus 1 remains in the Manual mode parameter non-change state.

In the Manual mode parameter non-change state, when a parameter change instruction is given by the user, the parameter change is written in the common memory, and the state is shifted to a Manual mode parameter change state.

In the Manual mode parameter change state, when the parameter change instruction is given by the user, the parameter change is written in the common memory, and the mobile terminal test apparatus 1 remains in the Manual mode parameter change state.

In the Manual mode parameter change state, when the parameter application instruction is given by the user or the control unit 6, the state is shifted to a Manual mode parameter application state, and the parameter application process is performed.

In the Manual mode parameter application state, when the parameter application is completed, the state is shifted to the Manual mode parameter non-change state.

In the Manual mode parameter change state, when a switching instruction to the Automatic mode is given, the state is shifted to the Manual mode parameter application state and the parameter application process is performed. When the parameter application is completed, the state is shifted to the Manual mode parameter non-change state, and shifted to the Automatic mode parameter change reception state.

In the Manual mode parameter non-change state, when the user or the control unit 6 gives a switching instruction to the Automatic mode, the state is shifted to the Automatic mode parameter change reception state.

In this manner, in the embodiment described above, it is possible to switch between the Automatic mode in which a parameter is changed at any time and a control message is transmitted to the mobile terminal 10 and the Manual mode in which change information on a parameter is held and a control message corresponding to the held change information on the parameter is transmitted to the mobile terminal 10 when a parameter application instruction is given.

As a result, in a case where there are few parameter changes or a case where it is desired to immediately transmit a control message to the mobile terminal 10, the Automatic mode is selected, and in a case where there are a large number of parameter changes, the Manual mode is selected. Therefore, a processing load or a processing time can be reduced, and the test can be efficiently performed.

The 3rd generation partnership project (3GPP) standard defines a large number of major test items related to transmission power, signal quality, or the like, and further defines several test conditions (Test IDs) for each of these tests.

In a case where all the defined tests are executed, a flow is performed such that a common setting (OperationBand, Channel, scheduling, or the like) for a major item of a target is performed, and then a setting of a Test ID 1 condition is performed and measurement is executed to acquire a result, and a setting of a Test ID 2 condition is performed and measurement is executed to acquire a result, so measurement of all the test conditions in the major item of the target is completed, then the common setting for the next major item test is performed. The order of all the defined tests is common settings first, then TEST ID1, then Test ID2.

At this time, it is necessary to change dozens of parameters or more, from the common setting to the setting of Test ID 1 condition. Meanwhile, in a case of changing to the condition of Test ID 2 after the Test ID 1 test is completed, for example, only RB Allocation is changed, so that only two parameters to be changed are Starting RB and Number of RB.

In this manner, by applying the Manual mode to the common setting unit in which a large number of parameter changes are required, the internal processing time can be reduced, and by applying the Automatic mode in the subsequent Test ID change unit, it is possible to omit the transmission of the parameter application instruction.

Although the embodiment of the present invention is disclosed, it is apparent that the embodiment can be modified by those skilled in the art without departing from the scope of the present invention. All such modifications and equivalents are intended to be included in the following claims.

DESCRIPTION OF REFERENCE NUMERALS AND SIGNS

1 mobile terminal test apparatus
2 simulation base station unit
3 scenario processing unit
4 operation unit
5 display unit
6 control unit
10 mobile terminal
What is claimed is:

1. A mobile terminal test apparatus that tests a mobile terminal by simulating a base station of mobile communication, the mobile terminal test apparatus comprising:
   a control unit that switches, as a mode for transmitting a control message to the mobile terminal, between:
      an automatic mode in which by a setting of a parameter by a user, the control message is transmitted to the mobile terminal when it becomes necessary to transmit the control message to the mobile terminal, and
      a manual mode in which when a user sets a parameter, a transmission of a control message indicating change information of the parameter is held, and the control message indicating change information is transmitted to the mobile terminal when a parameter application instruction is given by the user;
   a scenario processing unit; and
   a common memory shared by the control unit and the scenario processing unit,
   wherein the control unit:
      performs updating of the parameter in accordance with contents of the setting of the parameter,
      writes information on the updated parameter in the common memory,
      sends a parameter update notification to the scenario processing unit in a case where the Automatic mode is selected, and sends the parameter update notification to the scenario processing unit when the parameter application instruction is given, in a case where the manual mode is selected, and
   the scenario processing unit transmits the control message to the mobile terminal when receiving the parameter update notification transmitted from the control unit.

2. The mobile terminal test apparatus according to claim 1, wherein in the manual mode, the control unit stores change information of the parameter without immediately transmitting a control message to the mobile terminal, and is configured to accumulate a plurality of parameter changes.

3. A mobile terminal test apparatus that tests a mobile terminal by simulating a base station of mobile communication, the mobile terminal test apparatus comprising:
   a control unit that switches, as a mode for transmitting a control message to the mobile terminal, between:
      an automatic mode in which by a setting of a parameter by a user, the control message is transmitted to the mobile terminal when it becomes necessary to transmit the control message to the mobile terminal, and
      a manual mode in which when a user sets a parameter, a transmission of a control message indicating change information of the parameter is held, and the control message indicating change information is transmitted to the mobile terminal when a parameter application instruction is given by the user, wherein;
   a test in accordance with a standard of 3rd generation partnership project is performed on the mobile terminal,
   the manual mode is applied in a common setting and a Test ID 1 condition among a plurality of test items, and
   the automatic mode is applied to a Test ID 2 condition.

4. The mobile terminal test apparatus according to claim 3, wherein in the manual mode, the control unit stores change information of the parameter without immediately transmitting a control message to the mobile terminal, and is configured to accumulate a plurality of parameter changes.

* * * * *